United States Patent Office 3,363,173
Patented Jan. 9, 1968

3,363,173
ALTERNATING CURRENT BRIDGES USING RATIO TRANSFORMERS
John Mildwater, Chessington, Surrey, England, assignor to The Wayne Kerr Laboratories Limited, Chessington, Surrey, England, a British company
Filed Sept. 16, 1964, Ser. No. 396,992
Claims priority, application Great Britain, Sept. 18, 1963, 36,809/63
3 Claims. (Cl. 324—57)

ABSTRACT OF THE DISCLOSURE

In a transformer ratio arm alternating current bridge having secondary windings of a ratio transformer for applying voltages to an unknown and a standard, the error in the voltage applied to the unknown due to the short circuit impedance of the winding feeding the unknown is corrected by using a high gain amplifier to amplify the difference between the actual voltage applied to the unknown and the desired voltage. The desired voltage is obtained for this purpose from a further winding on the transformer. The amplifier output augments the voltage applied to the unknown so reducing the error.

---

This invention relates to alternating current transformer ratio arm bridges.

In such a bridge, two secondary windings of a transformer are used to apply voltages respectively to an unknown and a standard impedance; the resultant currents through the two impedances are then compared using a null balance indicator. The effective voltage applied to the unknown, however, differs slightly from open circuit voltage of the winding of the transformer because of the current drawn from the winding. It is an object of the present invention to provide, in a transformer ratio arm bridge, compensation for this error.

This is achieved, in the present invention, by using a high gain amplifier to amplify the difference between the voltage actually applied to the unknown and the voltage it is required to apply and to use the amplified error voltage as an additional voltage applied to the unknown to reduce the error.

Figure 1:
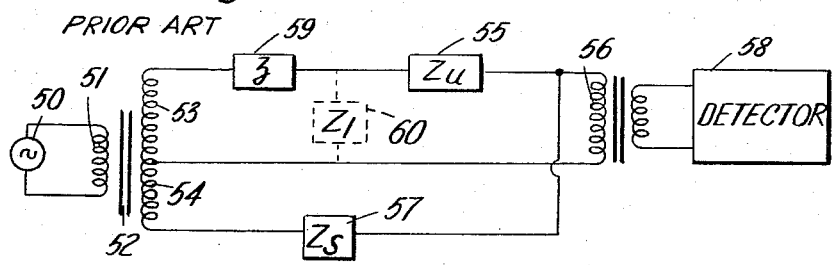
Figure 2:
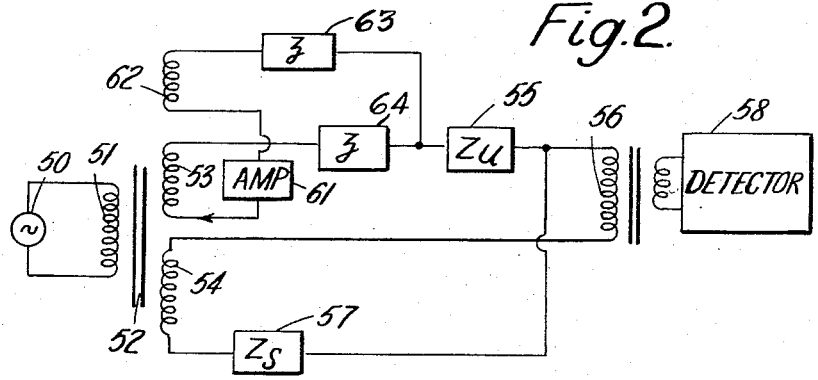

FIGURE 1 is a diagram illustrating a known type of transformer ratio arm bridge; and FIGURE 2 is a diagram of one form of bridge embodying the present invention.

FIGURE 1 illustrates in simplified form a known type of transformer ratio arm bridge having a source 50 feeding an alternating current to the primary winding 51 of a voltage transformer 52 which has two closely coupled secondary windings 53, 54. The winding 53 develops a voltage E which is applied to an unknown impedance 55 of magnitude $Zu$ to produce a current $i_a$ in a detector winding 56 of an output current transformer. This current is balanced by the current from winding 54 through a standard impedance 57, null balance being indicated on a detector 58. An error is produced by the current drawn from the voltage transformer by the unknown impedance 55. This error takes the form of a voltage developed across the short circuit impedance $z$ of the transformer winding, indicated diagrammatically at 59, the voltage across the unknown impedance 55 now being different from $E_1$ the open circuit voltage of the transformer. This effect limits the impedance which can be measured in this way. The error can be introduced also, and in many cases to a far greater extent, by a shunt loading as indicated at 60.

FIGURE 2 illustrates a way to reduce this effect by means of a feedback amplifier, thus increasing the usable range of the bridge and improving the tolerance to shunt loading for a given accuracy or alternatively to improve the accuracy for a given range and loading. Referring to FIGURE 2, the winding 53 is no longer connected to the earth or neutral point of the bridge but is taken to the output of a high gain amplifier 61 of gain $\mu$. The input of the amplifier is taken from one end of a further winding 62 similar to the winding 53. The other end of the winding 62 is connected to the junction of the unknown impedance 55 and the winding 53. This winding 62 will have a short circuit impedance $z$ indicated at 63. The phase of the windings is so arranged that the input voltage to the amplifier, with no current being drawn from winding 53, that is with the unknown impedance 55 disconnected, would be zero. In other words the two windings are in voltage opposition. Now with the unknown impedance 55 in circuit, a current $i_a$ flows through this impedance. In the arrangement of FIGURE 1, this current through the unknown produces an error factor $$\left(1 - \frac{z}{Zu}\right)$$

With the arrangement of FIGURE 2 however, when $i_a$ flows, producing an error voltage developed across the short circuit impedance $z$ indicated at 64 of winding 53, an error voltage $\epsilon$ appears at the input of the amplifier 61. This gives an output voltage $E_o$ in series with winding 53 in such sense as to reduce the error voltage $\epsilon$. It may be shown that the error factor involved in the voltage supplied to the unknown impedance 55 is now $$1 - \frac{z}{\mu Zu}$$

This is an improvement of $\mu$ times over the arrangement of FIGURE 1. It can be shown that provided the input impedance of the amplifier is greater than $z$, the current drawn by the amplifier does not affect the operation; this is readily achieved since the normal design of transformer would be to keep $z$ as low as possible. Further improvement can be obtained by taking the output of the amplifier 61 through a voltage step-down transformer.

Although the system of FIGURE 2 requires duplication of the windings on the unknown side of the bridge compared with FIGURE 1, an improvement of $\mu/z$ can be obtained even if the amount of copper in each winding is halved to get the windings in the same space. In practice, bifilar windings are preferably used, the ultimate improvement being reached when the error voltage fed to the input of the amplifier approaches the open circuit error of the two windings 53, 62. With bifilar windings on a transformer of good design, this ultimate accuracy can be made very high indeed.

I claim:
1. An alternating current transformer ratio arm bridge having an input transformer with a primary winding and first and second secondary windings, an alternating current source for energizing said primary winding, circuit means for applying voltages from said first and second windings to an unknown and a standard impedance respectively and means for comparing the resulting currents through the unknown and standard impedances; wherein there is provided a further secondary winding on said input transformer having the same number of turns as said first secondary winding, and a high gain amplifier, means for applying in opposition to the amplifier the voltage applied to said unknown and the voltage across said further secondary winding whereby the difference of the voltage is amplified and means for applying the amplified difference voltage to the unknown additively in series with the voltage from said first secondary winding.

2. An alternating current transformer ratio arm bridge as claimed in claim 1 wherein said high gain amplifier has an input and an output and wherein there are provided means connecting said further secondary winding in series between the amplifier input and the unknown impedance to apply in opposition to the amplifier input the voltage across said further secondary winding and the voltage applied to said unknown so that the amplifier amplifies the difference of these voltages, and means applying the amplifier output in series with said first secondary winding to augment the voltage applied to the unknown.

3. An alternating current transformer ratio arm bridge comprising an input transformer having a primary winding, first and second secondary windings and a further secondary winding having the same number of turns as said first secondary winding, means for feeding an alternating current to said primary winding, an unknown impedance, a standard impedance, a null balance detector, means connecting said second secondary winding and said standard impedance in a series circuit with said null balance detector to feed a first current into the detector, a high gain amplifier having an input and an output, means applying the amplifier output in series with said first secondary winding to augment the voltage therefrom, means connecting the first secondary winding in a series circuit with said unknown to feed a second current into the detector in opposition to the first current, and means connecting said further secondary winding in series between the amplifier input and the connection between the unknown and the first secondary winding so that the amplifier amplifies the difference between the voltage applied to the unknown and the voltage from said further secondary winding.

References Cited

UNITED STATES PATENTS

| | | | |
|---|---|---|---|
| 3,031,614 | 4/1962 | Calvert | 324—57 |
| 3,039,050 | 6/1962 | Krohn | 324—57 |
| 3,293,546 | 12/1966 | Calvert et al. | 324—57 |

JOHN F. COUCH, *Primary Examiner.*

A. D. PELLINEN, *Assistant Examiner.*